G. H. Munroe,
Preserving Meat.
No. 102,302. Patented Apr. 26, 1870.

Witnesses:
John Fahnestock
James S. Laird

Geo. H. Munroe
Patentee
New York City.

United States Patent Office.

GEORGE H. MUNROE, OF NEW YORK, N. Y.

Letters Patent No. 102,302, dated April 26, 1870.

IMPROVEMENT IN APPARATUS FOR COOKING MEAT BY STEAM.

The Schedule referred to in these Letters Patent and making part of the same.

*To all whom it may concern:*

Be it known that I, GEORGE H. MUNROE, of the city, county, and State of New York, have invented a new and useful Apparatus for Cooking Meat by the use of Steam; and I do hereby declare the following to be a full, clear, and accurate description of the same, reference being had to the accompanying drawings, of which—

Figure 2:
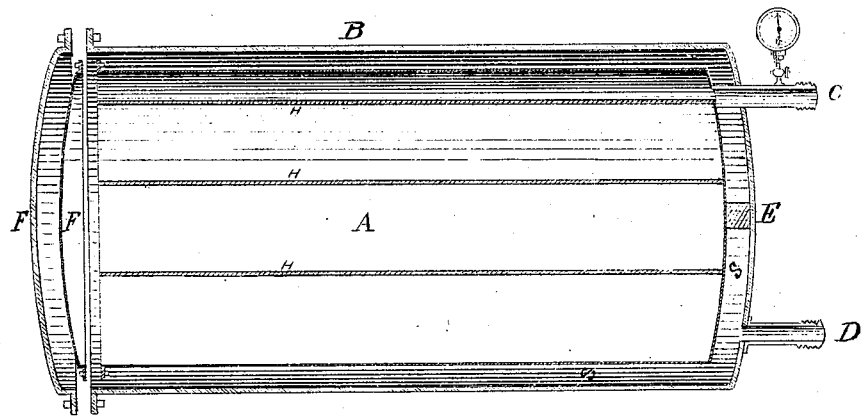

Figure 1 represents a longitudinal section;

Figure 2, a transverse section; and

Figure 3:
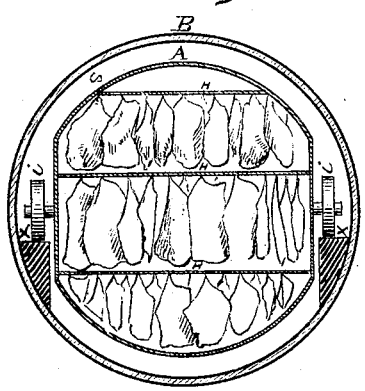

Figure 3, an external view of the end thereof.

The object of my invention is to provide a means of cooking meats by the action of steam heat upon the external surface of the receptacle containing the same, a vacuum having been previously formed within the interior of said receptacle.

In the drawings—

A is a cylinder of copper or other suitable material, in which is placed the meat, either suspended or placed upon shelves.

B is an outer cylinder or jacket, of boiler iron or other suitable material, provided with a ledge or track, as shown at $x$, fig. 2, upon which tracks, $i$ $i$, fig. 2, connected with the cylinder A, are made to run. The cylinder A, it will be observed, does not fit closely into the jacket B, but a space is left on all sides, as shown at S.

C is a pipe penetrating cylinder A and running through cylinder B, where a connection is formed with a vacuum-pump, the said point of connection being shown at $c$, fig. 3.

D is a pipe in lower portion of the end of cylinder or jacket B, which pipe is used to connect with steam-boiler and admit steam to chamber S.

E is a metallic block attached to cylinder B, to pre- cylinder A from running back too far.

F F are doors to cylinders A and B.

H H H are shelves or rods, from which the meat may be suspended or upon which it may be placed.

The mode of operating this oven will be readily comprehended. The inner cylinder having been supplied with the meat to be cooked, it is placed *in situ*, and the door is hermetically closed. The door of the external cylinder is then closed, and the vacuum-pump applied to the pipe C, through which the air is exhausted, and a vacuum formed. Steam is then let on at the port D, and the cooking process commences.

The advantages which this method possesses over other methods with which I am familiar are as follows:

First, I find that less heat is required to cook the meat.

Secondly, I am enabled to save all the juices, flavor, and nutritious properties of the meat.

Thirdly, and more important than all, I find that by allowing the cooked meat to remain *in vacuo*, it may be preserved uninjured until I am ready to consume it or otherwise dispose of it. Therefore,

What I claim as new and useful, and what I desire to secure by Letters Patent of the United States, is—

1. The cylinder A and jacket B, arranged as described and provided with steam-pipe D and vacuum-pipe C, substantially as and for the purposes set forth.

2. The method of cooking meat or other substances *in vacuo*, by the use of steam applied to the exterior of the receptacle containing the article to be cooked, the whole arranged substantially as above described.

GEO. H. MUNROE.

Witnesses:
TREADWELL CLEVELAND,
FRANK FULLER.